United States Patent [19]

Porter

[11] Patent Number: 5,638,872

[45] Date of Patent: Jun. 17, 1997

[54] SIPHONING DEVICE FOR USE IN BASTING, MEASURING OR IMMISCIBLE LIQUID SEPARATION

[75] Inventor: Jerry Porter, Charlottesville, Va.

[73] Assignee: National Safety Advisors, Inc., Charlottesville, Va.

[21] Appl. No.: 518,006

[22] Filed: Aug. 22, 1995

[51] Int. Cl.$^6$ .................................................. A47J 37/00
[52] U.S. Cl. .......................... 141/26; 141/352; 141/357; 99/345
[58] Field of Search ...................... 141/21–29, 351, 141/352, 354, 357, 310, 335; 99/345

[56] References Cited

U.S. PATENT DOCUMENTS

| | | | |
|---|---|---|---|
| Re. 15,017 | 12/1920 | Somerville | 141/26 |
| D. 245,140 | 7/1977 | Benson | D7/99 |
| 972,075 | 10/1910 | Freeman | 141/26 X |
| 1,036,822 | 8/1912 | Freeman | 141/26 |
| 1,106,937 | 8/1914 | Goff | 141/27 X |
| 1,263,453 | 4/1918 | Medley | 141/26 |
| 1,977,062 | 10/1934 | Higley | 141/26 |
| 2,243,908 | 6/1941 | Kassab | 141/24 X |
| 2,489,035 | 11/1949 | Jones | 141/310 |
| 3,171,446 | 3/1965 | Koch | 141/24 |
| 3,713,378 | 1/1973 | West et al. | 99/346 |
| 3,908,532 | 9/1975 | Underwood | 99/347 |
| 4,066,010 | 1/1978 | Larsson | 99/346 |
| 4,129,066 | 12/1978 | Corley | 99/345 |
| 4,177,721 | 12/1979 | Redhead | 99/345 |
| 4,763,803 | 8/1988 | Schneider | 215/260 |
| 4,911,314 | 3/1990 | Schneider | 215/228 |
| 4,968,298 | 11/1990 | Michelson | 604/36 |
| 4,979,944 | 12/1990 | Luzsicza | 604/118 |
| 4,998,633 | 3/1991 | Schneider | 215/311 |
| 5,244,021 | 9/1993 | Hau | 141/29 X |
| 5,394,789 | 3/1995 | Evans et al. | 99/345 |

*Primary Examiner*—J. Casimer Jacyna

[57] ABSTRACT

The siphoning device, with measuring indicators, is used for liquid-liquid separation. The body member has an outlet with an open tip; the outlet can have a peripheral rim with notches proximate the open tip. A two-way liquid valve contoured to approximate the contour of the interior of the outlet, controls liquid flow out of the body and permits flow into the body. A stem portion affixed to the liquid valve extends through and beyond the open tip of the outlet. Pressure on the stem places the valve in an open position and permits liquid to be discharged. An air pump interacts with the body to expel air and draw in the liquids. Generally the air pump is a flexible bulb with a one-way air valve to restrict air flow into the hollow body while permitting air flow out. The hollow body can be in two parts which are removably connected to one another. The travel of the liquid valve within the hollow body is limited by stops.

18 Claims, 5 Drawing Sheets

SIPHONING DEVICE FOR USE IN BASTING, MEASURING OR IMMISCIBLE LIQUID SEPARATION

BACKGROUND OF THE INVENTION

1. Field of the Invention

The invention relates to a siphoning device having particular utility as a "food baster," but also lending itself for use as a device for medical, scientific and industrial applications. The device can be used for the separation of immiscible liquids. The device can further be used for withdrawal of a measured or unmeasured amount of liquid from a container in one location, storage of the liquid during transportation and deposit of the liquid in a container at a remote location. The device uses a combination of an air valve and a liquid valve.

2. Brief Description of the Prior Art

The devices commonly known as basters do not effectively contain the liquid which has been drawn into the device. Typically these devices expel some of whatever liquid the user is attempting to move before the device has reached the final destination.

The term baste is used in the application consistent with the definition in the American Heritage Dictionary, Third Edition, Copyright 1994, InfoSoft International, as follows:

baste tr.v. basted, basting, bastes.
To moisten (meat, for example) periodically with a liquid, such as melted butter or a sauce, especially while cooking. baster n.

In its simplest form (hereinafter referred to as the 'simple baster') the simple baster consists of only two parts. The first part is the bulb, which is typically made of rubber or a rubber-like plastic. The bulb is generally thick and soft to allow for flexibility as the device is operated by squeezing and releasing the bulb by hand. The second part is a hollow round tube or cylinder, tapered at one end to a small opening. The bulb is attached to the tube at the wider end, with the small opening being used to collect and disperse liquids. While baking meat, to add flavoring and prevent dehydration, it is desirable to take broth or meat juices to baste the meat. The baster is employed in this endeavor by holding the device in one hand and ejecting some of the air from the bulb. The lower end of the tube is placed below the liquid surface, the bulb is released and the vacuum draws the liquid into the tube. The tube is then moved to the top of the meat being cooked, the bulb is squeezed and the liquid is ejected over the meat. In the simple baster, when the liquid is drawn into the tube, it is frequently hot. The hot liquid heats the air in the tube and the bulb, causing expansion of the air. The expansion of the air forces at least some of the liquid out the tube. It is often impossible to draw or retain enough liquid in the baster to adequately baste the meat. Attempts to contain the liquid by turning the tube over, bulb end down, can leak hot liquid in an uncontrollable and dangerous fashion. Turning the baster all the way places the bulb, filled with hot liquid, near the user's hand and may cause burns through the flexible bulb.

Another way the simple baster is often used is to separate the meat juices into their component lighter fat and heavier water-soluble parts. When separated from the fat, the heavier water-soluble material is frequently used as a component in gravies. The heavier materials will be referred to as 'flavorings'. While it would be desirable to wait for a brief time for the fat and flavorings to separate, for distribution into different containers, this is not always feasible. The nature of the simple baster is not well suited for use as a separator because the contents begin to exit as soon as they have entered, often with outside air bubbling through and remixing the liquids to be separated. Any attempts to draw all the pan juices into the baster for separating in one operation results in mixing the pan juices, just the opposite of the desired separation.

Among the problems encountered in the simple baster is the inability to prevent the liquid from dripping out due to simple gravity. Further, the heat of the air trapped above the liquid, in both the tube and bulb, drives the liquid out of the baster in an uncontrolled manner.

Another shortcoming of the simple baster is the inability to measure or control the exact amount of liquid delivered by the baster. The only control over the volume entering the tube occurs when the bulb is squeezed a particular amount or the inlet pulled out of the liquid. The user must estimate how much to squeeze the bulb prior to insertion into the liquid, since squeezing the bulb after the tube has been partially filled drives the liquid out of the baster. Thus, the device cannot be operated in a cumulative manner.

The simple baster, or a similar device, can also be used for a multitude of tasks that involve moving liquids. These liquids can be hot or cold, acid or base, aqueous or not, highly fluid or partially viscous.

Small versions of the prior art simple baster, such as the medicine dropper, generally operate as intended. Volatile solutions, however can generate vapor pressure sufficient to force the liquid from the tube. Due to the small amount of liquid, the capillary action and/or surface tension, are sufficient to allow the dropper to retain the liquid until it is dispensed. As the medicine dropper is enlarged to the size of the simple baster, the flaws of the design appear.

Capillary action, as used herein, refers to the force that results from greater adhesion of a liquid to a solid surface than internal cohesion of the liquid itself. This action causes the liquid to be raised against a vertical surface, as water is in a clean glass tube. Surface tension, as used herein, refers to a property of liquids arising from unbalanced molecular cohesive forces at or near the surface. As a result, the surface tends to contract and has properties resembling those of a stretched elastic membrane.

In summary, the prior art simple basters are deficient in at least four ways:

1. Fluid leaks due to flow under the force of gravity.
2. When hot liquid is used, air above the liquid expands and pushes the liquid out, making the handling of liquids difficult and dangerous.
3. The amount of liquid that can be drawn up is limited by the size of the bulb and the air trapped within the bulb.
4. Making exact liquid measurements are difficult, because of leaking of the device and the inability to control the amount of liquid drawn into the device.

SUMMARY OF THE INVENTION

It has now been found that the problems of the prior art devices will be overcome through the use of a siphoning device which employs a pair of valves. The siphoning device is used in liquid-liquid separation for medical, scientific and industrial employment and food preparation. The body member has an outlet region with an open tip and a body region. The body region generally has a second open end. The outlet region can have a peripheral rim proximate the open tip region containing notches extending from the interior to the exterior of the outlet region. The notches allow for liquid passage into the hollow body member. The body portion can be provided with measuring means to indicate, in increments, the capacity of the body portion.

A two-way liquid valve positioned within the outlet region controls liquid flow out of the hollow body member and permits flow of liquid into the body. The body of the liquid valve is contoured to approximate the contour of the outlet's interior wall.

The valve is in a closed position when it is in contact with the interior wall of the outlet region, preventing liquid from passing between the valve and the wall. In the open position the valve is out of contact with the interior wall, allowing for passage of the liquid. A stem portion affixed to the liquid valve extends through and beyond the open tip of the outlet. The stem can, if desired, be removably connected to the valve. Pressure on the stem in the direction of the liquid valve body places the valve in an open position and permits liquid to be discharged. An o-ring can be positioned between the liquid valve and the interior wall to further seal the contact. The specific gravity of the valve must be greater than that of the liquids being separated.

An air pump interacts with the open second end of the body to expel air and draw in the liquids. Generally the air pump is a flexible bulb affixed to the second open end of the hollow body. A one-way air valve restricts air flow into the body while permitting air flow out. The one-way air valve can be of various designs as an integral part of said flexible bulb. Alternatively the one-way air valve can be within the body of the hollow body member.

The hollow body in one embodiment has a first and second portion which are removably connected to one another. The connection can be threaded.

The travel of the liquid valve within the hollow body is limited by optional stops. Generally the stops are within the hollow body member proximate the outlet region. Alternatively, the end of the stem portion can serve as a stop. The end would have a diameter greater than the stem portion and slightly less than the open tip region. The end of the stem portion can be removable from the stem.

In an alternate embodiment the siphoning device further comprises a flexible, elongated, connecting tube to connect the outlet portion and the body portion. This allows the device to siphon liquids at a distance from the body.

BRIEF DESCRIPTION OF THE DRAWINGS

The advantages of the instant disclosure will become more apparent when read with the specification and the drawings, wherein.

DESCRIPTION OF THE PREFERRED EMBODIMENTS OF THE INVENTION

Figure 1:
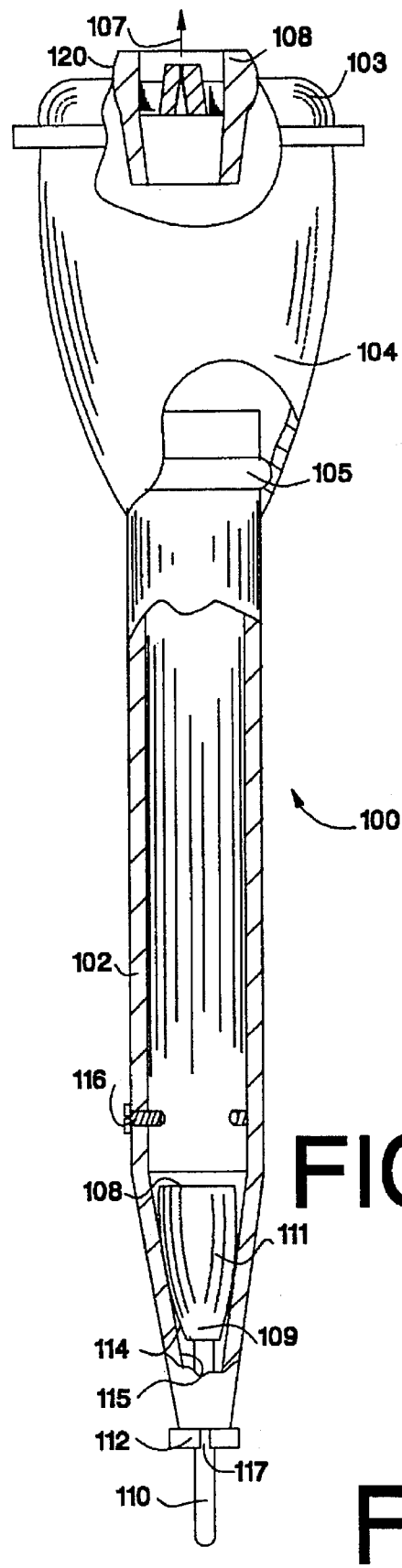
FIG. 1 is a side view, partly in cross-section, of the device of the instant invention.
Figure 9:
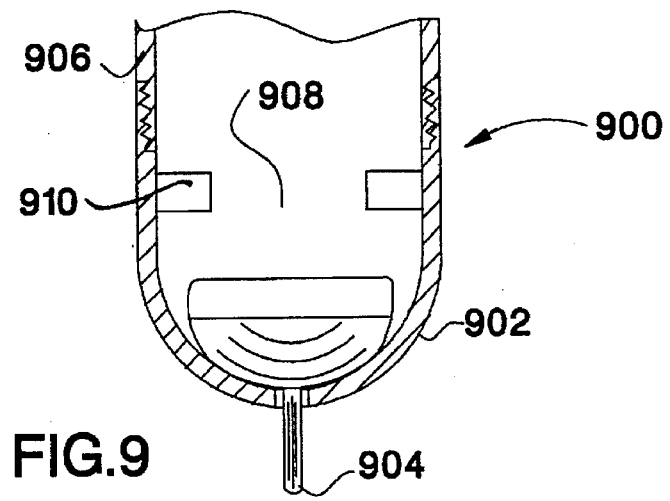
FIG. 9 is a cross-section of an embodiment of the device using a curved tip.

One configuration of the device of the present invention is illustrated in FIG. 1, indicated generally as baster 100. Baster 100 employs the basic two parts as described heretofore in the prior art, a hollow tube 102 and a bulb 104. Both the hollow tube 102 and bulb 104 are provided with valves which work in conjunction with each other to produce several new and non-obvious results. It should be noted that other body configurations can be incorporated with the improvements disclosed herein, dependent upon end use. A conventional hollow, elongated tube is shown and described in detail herein, as this would be the most commonly used configuration. One example of an alternate used is illustrated in FIG. 9 and, although not intended to limit the embodiments in any way, will give an example of alternate uses.

Figure 3:
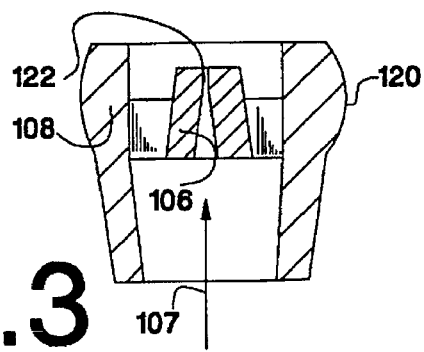
FIG. 3 is an enlarged view of an embodiment of an air valve for use in the bulb portion of the baster of FIG. 1.

The bulb 104 has been modified by the addition of a one-way air valve 120 installed at the top 103 of the bulb 104, as illustrated in further detail in FIG. 3. The one-way valve 120 permits air to exit the bulb 104, as indicated by arrow 107. The materials of manufacture of the one-way valve is not narrowly critical and flexible rubber, silicone or other polymeric materials can be used. Optimally, the one-way valve 120 can be formed integrally with the bulb 104, although other methods of manufacture can be utilized. The bulb design is similarly not narrowly critical and the bulb can be formed of the same or materials similar to those used to form the one-way valve 120. The bulb can be attached to the tube 102 and prevented from separating from the tube through use of a groove which cooperates with an annular ring 105 in the upper peripheral end of the tube 102. The connection design is not narrowly critical and other means, known in the art, can be used to attach the bulb 104 to the tube 102.

Figure 2:
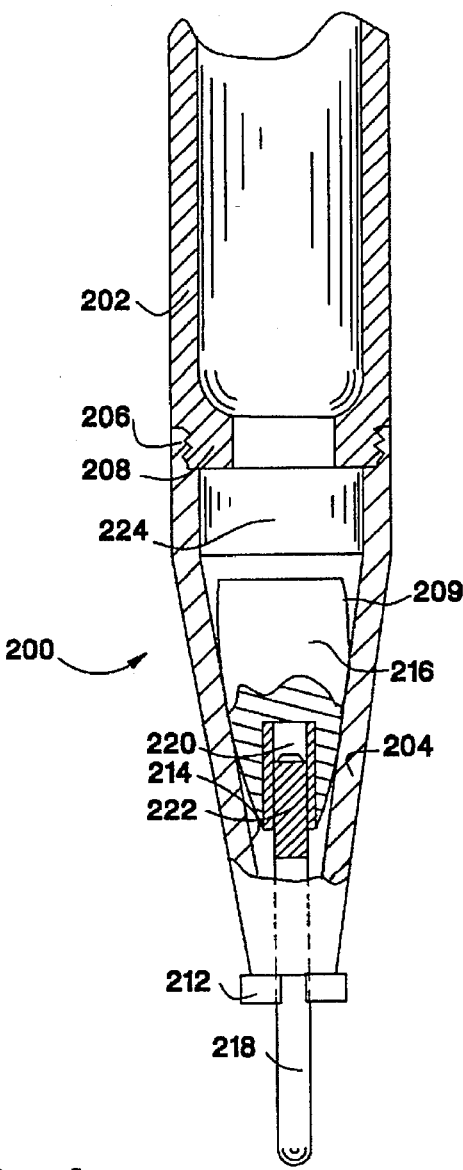
FIG. 2 is an enlarged fragmentary view, partly in cross-section, of an alternate embodiment of a tube portion of a baster of the instant invention.

The tube 102 is modified by the addition of a two-way liquid valve 109 that rests partially inside and partially outside of the tapered end 114. The special two-way liquid valve 109 consists of a valve body member 111 and a stem portion 110 and can be either a unitary member, or formed in parts, as described further herein. The liquid valve 109, is positioned inside the tapered end 114, of the tube 102 and conforms to the taper of the tapered end 114. The degree to which the body member 111 of the valve 109 and the interior surface 115 of the tapered end 114 conform is not narrowly critical. It is only critical that the body member 111 and the interior surface 115 have a region of equal diameter so that a seal can be formed and liquid flow past the sealed region restricted. The seal can be enhanced by the use of an 0-ring as is well known in the art, or by having the taper, or contour, of the two surfaces close or the same. A restricting portion, such as threaded screws 116 of FIG. 1 or molded tabs 910 of FIG. 9, extend into the tube 102 to prevent the valve 109 from sliding the entire length of the tube 102. It is further noted that the liquid valve 109 must be formed of an inert material having a higher specific gravity than that of the liquid which is being stored in the tube 102. Were the reverse true, the valve 109 would float in the liquid, thus opening the valve. As an alternate embodiment, the valve can be spring loaded to maintain the valve in the closed position. Such materials as brass and stainless steel can be used for the body 111 and the stem 110 of the valve 109. The valve 109 can also be used with the two piece baster 200 as illustrated in FIG. 2.

The tube outlet tip 112 of the tapered end 114 of the tube 102, can be provided with one or a plurality of slits or notches 117 which provide for liquid communication between the exterior of the tube and the interior of the tube 102. To open the valve 109, the tip 112 is placed at the bottom of a vessel, thereby moving the stem 110 into the tube 102. Because of the contact between the tip 112 and the bottom of the vessel, flow can be restricted, depending upon the pressure placed on the tip 112. To maintain a maximum flow, the notches 117 allow for liquid to be drawn into the drawn into the tube 102 even if the tip 112 is placed flush with the bottom of the vessel.

The usual operation of the baster 100 of the present invention involves squeezing the bulb 104, thereby forcing air out of the baster 100. The device tube outlet tip 112 is inserted into the liquid to be drawn into the device. The pressure on the bulb 104 is then released and the liquid is thus drawn into the tube 102. If it is desired to draw additional liquid into the tube 102, the process can be repeated until a desired quantity is retained in the tube 102. The repetitive action is possible because the liquid valve 109 is forced against the interior surface 115 by the gravitational pressure of the liquid, thereby preventing the liquid from being expelled. Pressure from the heated air is eliminated as the built-up air pressure released through the upper one-way air valve 120, in the direction of arrow 107. Thus, the upper and lower valves act together to provide the desired result.

To empty the baster 100 of its liquid contents, the stem portion 110 is placed against the surface intended to receive the liquid. This action forces the stem portion 110 into a position flush with the tube outlet tip 112, raising the valve 109 into a position where the valve 109 is no longer blocking the tapered portion of the tube 102. In this manner the liquid valve 109 is opened and the liquid is discharged through the open end of the tube. If the surface tension or viscosity is sufficient to hold back the liquid, the bulb can be squeezed to force the liquid past the liquid valve 109 while maintaining continued contact between the stem portion 110 and the desired deposit location. As noted heretofore, excessive migration of the liquid valve 109 into the tube can be prevented, if so desired, by use of a restricting region, as disclosed herein.

FIG. 2 shows an alternate embodiment in which the baster 200 is manufactured in sections. The tube base 202 is attached to the tapered end 204 through threaded sections 208 and 206. By having the ability to separate the tube base 202 from the tapered end 204, the baster tube 200 can be easily opened for cleaning. There are two methods of manufacture for the two part baster 200, interior threading and exterior threading. The interior threading is illustrated in FIG. 2 utilizes a smaller diameter tube base 202 with the wider tapered end 204, thereby preventing the liquid valve 209 from migrating to the top of the base 202. In the event exterior thread designed is used which does not provide for the decrease of interior diameter, screws 116 or tabs 910 of FIG. 9, can be used to block the migration of the liquid valve 209. Although the baster 200 illustrated in FIG. 2 utilizes a threaded connection, other means known in the art can be utilized to connect the tapered end 204 to the tube base 202.

The alternate liquid valve 209, illustrated in FIG. 2, can be used with any of the tube embodiments illustrated herein. The stem portion 218 of the valve 209 can be removed from the body 216 of the valve 209. The stem 218 is removably secured to the body 216 by providing the stem portion 218 with threads 222 which mate with corresponding threads 214, on the interior of the stem-receiving-recess 220. The ability to remove the stem portion 218 from the body 216 allows for an ease in cleaning.

The air valve 120 of FIG. 1 is shown in more detail in FIG. 3, in which the air flow is indicated by the arrow 107. The valve 120 is provided with a flexible exterior body 108 and interior lips 106. The air passes through the space 122 between the lips 106, which flex when compressed and allow air to escape in the direction of the arrow 107. Pressure from the reverse direction does not cause lips 106 to separate, thereby resulting in a one-way valve.

Figure 4:
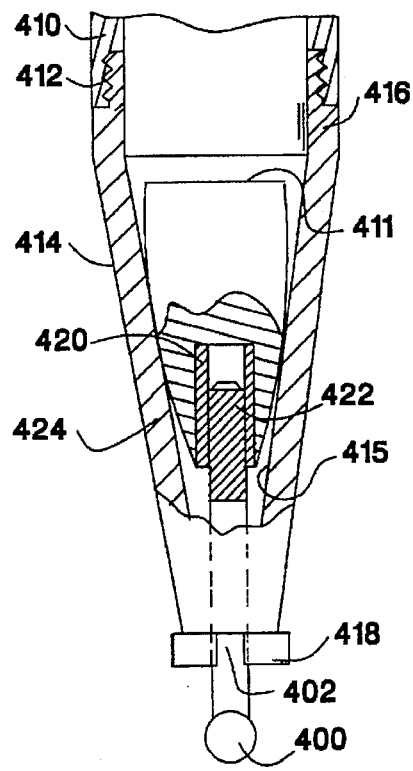
FIG. 4 is a fragmentary, side view, partly in cross-section, of an alternate embodiment of the liquid outlet valve.

Alternatively, as illustrated in FIG. 4, the end of the stem portion 402 can be fitted with a round end ball 400 which is sufficiently large to restrict easy retraction into the open end of the tapered portion 414 of the baster. The stem 402 is dimensioned to provide only a small gap between the ball 400 and the baster tube rim 418 when the valve body 411 is in contact with the interior surface 415 of the tube. Thus the liquid valve can normally only move a small distance up and down in the tube. The ball 400 can be removably attached to the stem 402 to allow for easy removal of the ball 400 for cleaning. Alternatively, the diameter of the end ball 400 is such that it can be forced up into the tube to allow removal of the entire liquid valve for purposes of cleaning.

The elongated tip or ball can be manufactured from any inert substance which can withstand the exposure to heat. This can include many types of metals, such as used for cooking pots. To decrease the risk of a burn due to contact with the tip of the baster a low conducting ceramic can be used.

Figure 5:
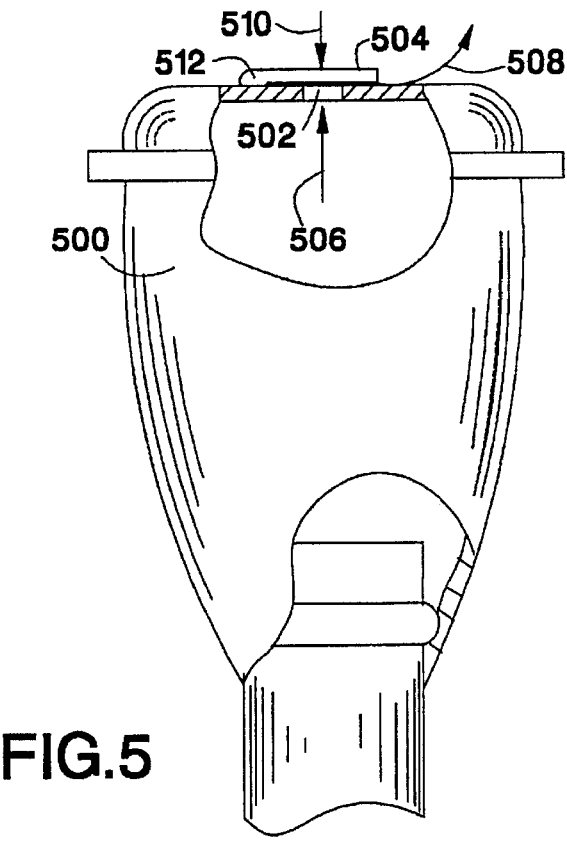
FIG. 5 is a fragmentary, cutaway side view of the baster bulb portion with an alternate flap style air valve.

Any type of one-way air valve can be substituted for the air valve specifically shown in the drawings. Alternatives to the foregoing valves are illustrated in FIGS. 5, 6, 7A, 7B and 8. In FIG. 5 a membrane 504 is placed over the vent hole 502 and secured to the bulb 500 at hinge 512. The hinge 512 is simply a self-hinge formed by affixing the membrane 504 to the bulb 500. The air is allowed to vent out the vent hole 502 in the direction of arrow 506. Under extreme pressure, such as when the bulb is being squeezed, the membrane 504 will lift from the surface of the bulb 500. Air can also escape without the membrane 504 being lifted in the direction of arrow 508. Air is prevented by the membrane 504 from entering the bulb 500 through the vent hole 502, in the direction of arrow 510.

Figure 7B:
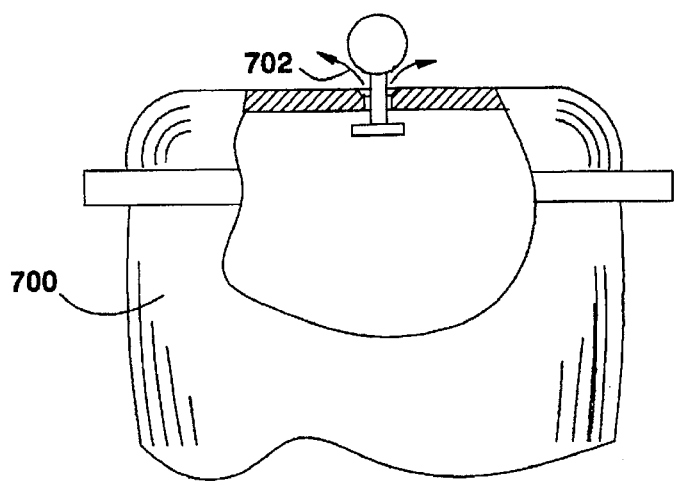
FIG. 7B is a fragmentary, cutaway side view of the baster bulb portion of FIG. 7A in the open position.
Figure 7A:
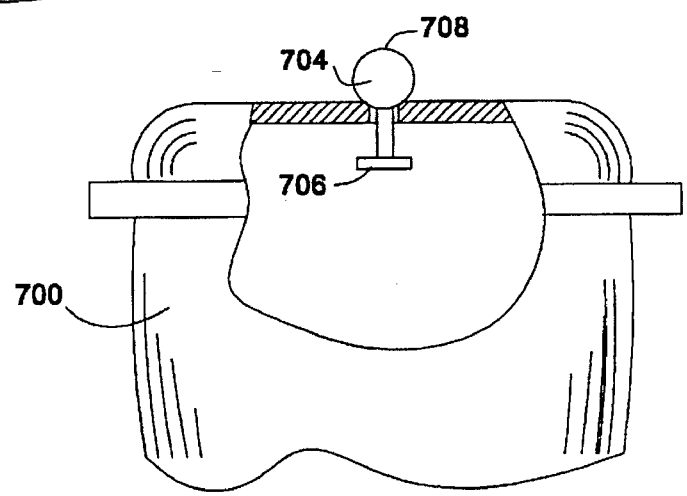
FIG. 7A is a fragmentary, cutaway side view of the baster bulb portion with a ball seal air valve in the closed position.
Figure 6:
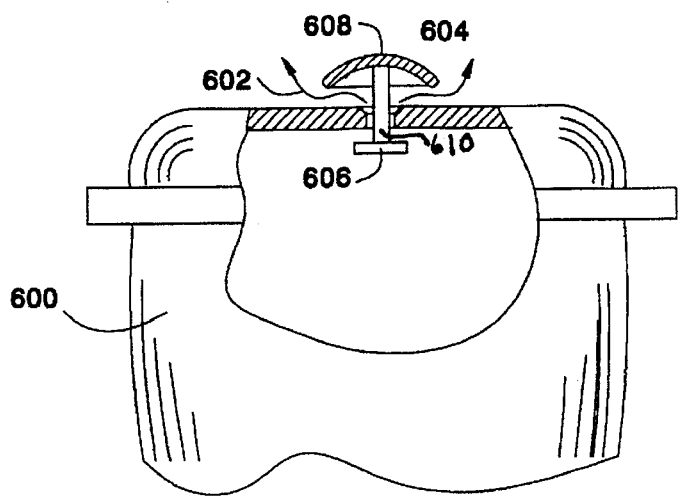
FIG. 6 is a fragmentary, cutaway side view of the baster bulb portion with a curve seal air valve.

In FIGS. 6, 7A and 7B the valves 608 and 708 incorporate safety mechanisms to prevent the flow of hot liquid out of the one-way air valve should the user invert the baster, filling the bulb with hot liquid. In FIG. 6, the valve 608 incorporates a curved lid 604 affixed to a stem 610 which extends through the vent hole of the bulb 600. Within the bulb 600 the stem is affixed to a blocking plate 606 which, when the bulb 600 is inverted, prevents liquid from escaping through the vent hole. The air is allowed to escape on either side of the stem 610 in the direction of arrows 602. In FIGS. 7A and 7B, the valve 708 uses a ball top 704 rather than the curved lid 604. The valve 708 is also provided with a blocking plate 706 to prevent spillage. As with valve 608, the air is allowed to escape on either side of the valve in the direction of arrows 702. To provide for more convenient handling, it is preferable that the top of the bulb 700 be curved to allow for the ball top 704 to be recessed within the top.

Figure 8:
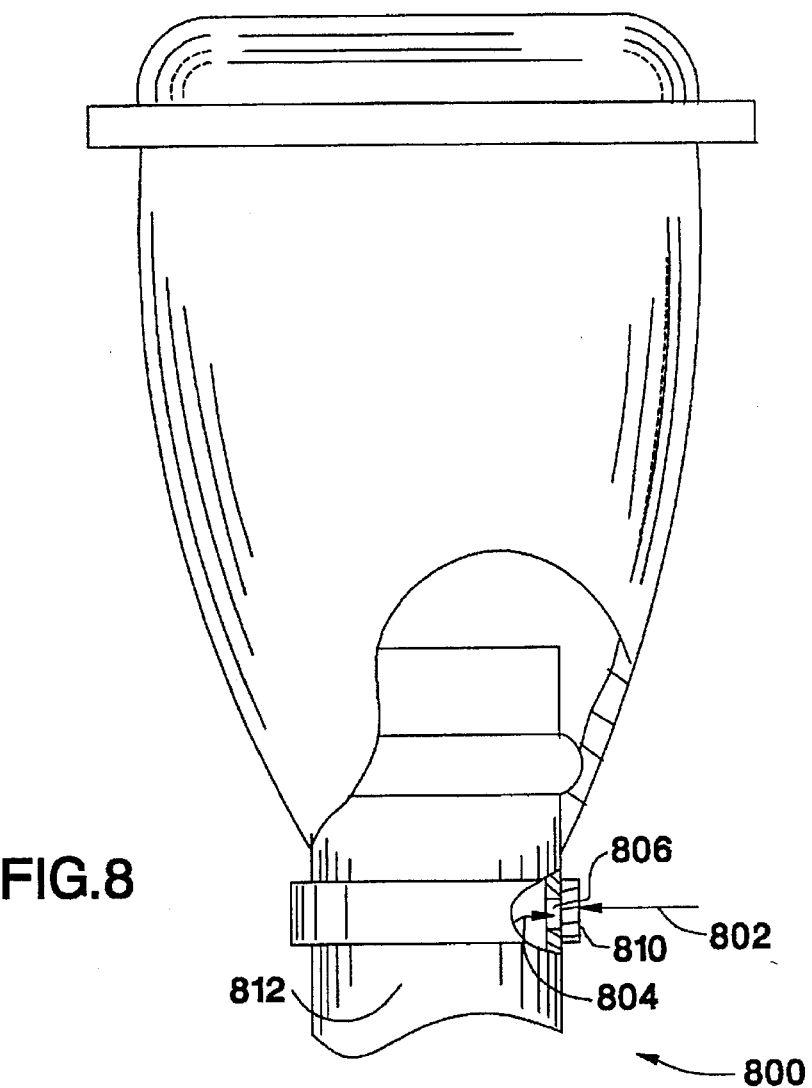
FIG. 8 is a fragmentary, cutaway side view of the instant device with an alternate band air valve incorporated into the baster tube.

An alternate air valve is illustrated in baster 800 of FIG. 8 wherein the vent hole 806 is placed in the upper portion of the tube 812. A vent hole 806 is placed in the tube 812 and covered with a flexible band 810 which serves as a one way valve. When pressure is built up within the tube 812, the trapped air forces the band 810 to expand, allowing the air to be expelled in the direction of arrow 804. Air is prevented from entering the tube 812, in the direction 802, by the band 810.

An alternate to the tapered end is illustrated in FIG. 9 wherein the tapered tip of the prior embodiments have been replaced with curved tip 902. The molded tabs 910, illustrated in An alternate to the tapered end is illustrated in FIG. 9 wherein the tapered tip of the prior embodiments have been replaced with curved tip 902. The molded tabs 910, illustrated in this Figure, are used to maintain the liquid valve 904 in place. The molded tabs 910 replace the screws 116 illustrated in FIG. 1 and can either be configured as a ring along the interior periphery or as tabs periodically extending into the interior of the body 906. For ease of cleaning the curved tip 902 is preferably in threaded connection with the body 906, as described in FIG. 2. The threaded connection can either by flush, as illustrated, or graduated, as illustrated in FIG. 2. In the event the graduated design used, the tabs 910 can be eliminated. The liquid valve 904 can be any of the designs described heretofore configured to the shape of the curved tip 902. The curved tip 902 provides the advantage that the valve 904 does not get lodged, or stick, within the tip 902. The body of the valve 904 must have a width greater than the liquid inlet 908 to prevent the valve 904 from migrating to the body 906.

The operation of the device involves the steps of:
1) inserting the outlet region into a liquid such that the opening of the outlet region is below the surface of the liquid,
2) pumping air out of the device through the one-way air valve, (Steps 1 and 2 above can be reversed)
3) drawing liquid into the device,
4) withdrawing the opening of the outlet region from the liquid,
5) moving the device to a desired location, and
6) activating the liquid valve and causing the dispensing of the desired portion of the liquid.

Figure 10:
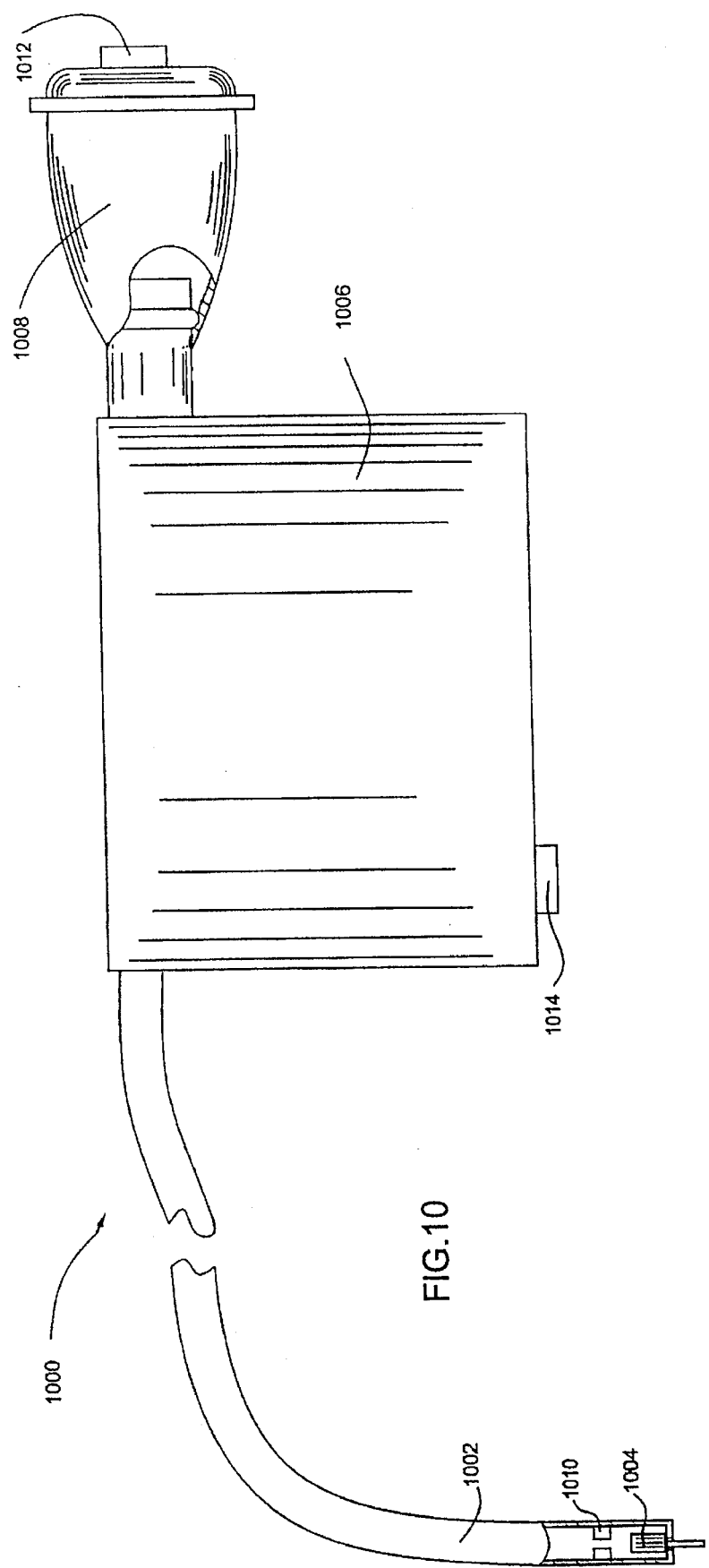
FIG. 10 is a side view of an alternate embodiment of the siphoning device of the instant invention.

FIG. 10 illustrates an example of an alternate use and design of the instant invention. The siphoning device 1000 comprises a flexible tube 1002, retaining receptacle 1006 and air pump 1008. The tube 1002 is provided with stop tabs 1010 which prevent the liquid valve 1004 from migrating into the retaining receptacle 1006. The air pump 1008 contains a one-way air valve 1012 which prevents air from entering the retaining receptacle. The end of the tube 1002, containing the liquid valve 1004, is placed in the liquid to be siphoned, such as oil from an engine. The air pump 1008 is activated, drawing the liquid up and into the retaining receptacle 1006. The retaining vessel 1006 is preferably manufactured with port 1014 to allow for easy emptying of the retaining vessel 1006. The design allows for the retaining vessel 1006 to be a size to accommodate the liquid to be stored. The tube 1002 is advantageous in siphoning liquids in hard to reach areas, such as engines, manufacturing equipment, etc.

Another safety-oriented variation for use with the bulb basters could be the use of a non-air tight cover or deflector to be placed at the top of the air valve to dilute the hot air being ejected from the bulb to preclude any chance of a user being met with hot air from the bulb. Further, a simple hand pump could be substituted for the rubber bulb.

Since other modifications and changes varied to fit particular operating requirements and environments will be apparent to those skilled in the art, the invention is not considered limited to the examples chosen for the purposes of disclosure, and covers all changes and modifications which do not constitute departures from the true spirit and scope of this invention.

What is claimed is:

1. A siphoning device for use in the basting of foods with a hot liquid and liquid-liquid separation of hot liquids, comprising:
    a hollow body member,
        said body member having an outlet region,
            said outlet region having an interior tapered surface and a first open tip end with a fluid flow opening, said fluid flow opening having a radial dimension, and
        an elongated body region, said elongated body region having a second open end,
    a two-way liquid valve, said two-way liquid valve being positioned within said outlet region, proximate said first open tip end, and
    air pump means, said air pump means interacting with said second end of said body region to expel air from said hollow body member and to draw liquid into said hollow body member,
    said two-way liquid valve having an elongated stem member and a seal means, said seal means being movably positioned within said outlet region,
        said seal means being movable from a first position to a second position and engaging said interior tapered surface of said outlet region, proximate said first open tip when in said first position, thereby precluding fluid flow out of said hollow body member, and disengaging said interior tapered surface of said outlet region when in said second position, thereby permitting flow into and out of said hollow body member, said stem member having a first end and a second end, and being affixed to said seal means at said first end for travel with said seal means, the length of said stem member being substantially greater than said first open tip end fluid flow opening radial dimension,
    whereby when said seal means is in said first position, said stem portion extends through and substantially beyond said open tip end, and when said stem portion second end is moved toward said open tip end of said outlet region, said seal member is moved away from said interior tapered surface of said outlet region a distance which is substantially greater than said fluid flow opening radial dimension and providing a progressively increasing opening and axial flow of liquid out of said open tip end and past said stem portion;
    and wherein pressure on said stem portion in the direction of said seal means moves said seal means out of contact with said interior wall, thereby placing said liquid valve in an open position and permitting liquid to be discharged axially from said hollow body member, through said first open tip end fluid flow opening and along said stem member.

2. The siphoning device of claim 1, wherein said air pump means is a flexible bulb affixed to said second open end of said hollow body member.

3. The siphoning device of claim 2, wherein said stop means is located at the end portion of said stem member, said stop means having a diameter greater than the diameter of said fluid flow opening.

4. The siphoning device of claim 1, wherein the travel of said liquid valve body member toward said open position is limited by stop means.

5. The method of liquid separation and transfer using a device having an hollow body member, said body member having a outlet region, a two-way liquid valve positioned within said outlet region and having a stem member extending through said outlet region to the exterior of said hollow body member, said liquid valve restricting liquid flow out of said hollow body member and permitting the flow of liquid into said hollow body member, air pump means, said air pump means being in fluid tight engagement with said hollow body member and interacting with said liquid valve to expel air from said hollow body member and to draw fluid into said hollow body member, comprising the steps of:

pumping air out of said device through said air pump means by constricting said air pump means, inserting said outlet region into a hot liquid such that the outlet of said outlet region is below the surface of said liquid, siphoning liquid into said device, by releasing said air pump means, withdrawing said outlet region from said liquid, the two-way liquid valve restricting flow of liquid out of said device, moving said device to a desired location, activating said liquid valve by applying pressure on the portion of said stem member which extends exteriorly of said hollow body member, to allow said liquid to flow from said body member to said desire location, and axially dispensing along said stem member, at least a portion of said liquid at said desired location.

6. The method of claim 5, wherein said liquid is a plurality of immiscible liquids and further comprising the step of successively separating at least two of said immiscible liquids into separate containers, thereby separating said immiscible liquids.

7. A siphoning device for use in the basting of foods with a hot liquid and liquid-liquid separation of hot liquids, comprising:

a hollow body member, said body member having a first end, a second end and an elongated body region between said first end and said second end,
said first end having an interior tapered surface and a fluid flow opening, said fluid flow opening having a maximum radial dimension, and said tapered surface tapering inwardly toward said fluid flow opening, air pump means, said air pump means interacting with said second end of said body member to expel air from said hollow body member and to draw liquid into said hollow body member, and a two-way liquid valve, said two-way liquid valve being positioned at said first end, proximate said fluid flow opening, and having an elongated stem member and a seal means, said seal means being fixed to said stem member, said stem member having a first end and a second end, and being affixed to said seal means at said first end for travel with said seal means, the length of said stem member being substantially greater than said first open tip end fluid flow opening radial dimension, said stem member extending through said fluid flow opening, said seal means being movable from a first position to a second position, and engaging said interior tapered surface of said outlet region, proximate said first open tip when in said first position, thereby precluding fluid flow out of said hollow body member, and disengaging said interior tapered surface of said outlet region when in said second position, thereby permitting flow into and out of said hollow body member, wherein in said second position, said stem member second extends beyond said fluid flow opening by a distance which is substantially greater than said fluid flow opening radial dimension, whereby when said seal means is in said first position, said stem portion extends through and substantially beyond said open tip end, and when said stem portion second end is moved toward said open tip end of said outlet region, said seal member is moved away from said interior tapered surface of said outlet region a distance which is substantially greater than said fluid flow opening radial dimension, providing a progressively increasing opening and an axial flow of liquid out of said fluid flow opening and along said stem portion.

8. The siphoning device of claim 7, wherein said air pump means is a flexible bulb affixed to said second open end of said hollow body member.

9. The siphoning device of claim 8, wherein said stop means is located at the end portion of said stem member, said stop means having a diameter greater than the diameter of said fluid flow opening.

10. The siphoning device of claim 7, wherein the travel of said liquid valve body member toward said open position is limited by stop means.

11. The siphoning device of claim 7, wherein said liquid valve body member has a specific gravity substantially greater that of the liquids being separated.

12. The siphoning device of claim 7, wherein said air pump means is a flexible bulb affixed to said second open end of said hollow body member.

13. The siphoning device of claim 7, wherein said outlet region further comprises a peripheral rim proximate said open tip region, said peripheral rim having notches, said notches extending from the interior to the exterior of said outlet region to allow for liquid passage into said hollow body member.

14. A siphoning device for use in the basting of foods with a hot liquid and liquid-liquid separation of hot liquids, comprising:

a hollow body member,
said body member having an outlet region,
said outlet region having an interior surface and a first open tip end with a fluid flow opening,
said fluid flow opening having a radial dimension, and
an elongated body region, said elongated body region having a second open end, a one-way air valve, said air valve restricting air flow into said hollow body member and permitting air flow out of said hollow body member, a two-way liquid valve, said two-way liquid valve being positioned within said outlet region, proximate said first open tip end for opening and closing said open tip end, and air pump means, said air pump means interacting with said second end of said body region to expel air from said hollow body member and to draw liquid into said hollow body member, said two-way liquid valve having an elongated stem member and a seal means, said seal means being movably positioned within said outlet region, said seal means being movable from a first position to a second position and engaging said interior surface of said outlet region, proximate said first open tip when in said first position, thereby precluding fluid flow out of said open tip end of said hollow body member, and disengaging said interior surface of said outlet region when in said second position, thereby permitting flow into and out of said open tip end of said hollow body member, said stem member having a first end and a second end, and being affixed to said seal means at said first end for travel with said seal means, said stem member extending substantially beyond said open tip end when said seal means is in said first position, and when said stem portion second end is moved toward said open tip end of said outlet region, said seal member is moved away from said interior surface of said outlet region thereby opening said open tip end;

and wherein pressure on said stem portion in the direction of said seal means moves said seal means out of contact with said interior wall, thereby placing said liquid valve in an open position and permitting liquid to be discharged axially from said hollow body member, through said first open tip end fluid flow opening and along said stem member.

15. The siphoning device of claim 14, wherein said air pump means is a flexible bulb affixed to said second open end of said hollow body member.

16. The siphoning device of claim 15, wherein said stop means is located at the end portion of said stem member, said stop means having a diameter greater than the diameter of said fluid flow opening.

17. The siphoning device of claim 14, wherein the travel of said liquid valve body member toward said open position is limited by stop means.

18. The method of liquid separation and transfer using a device having an hollow body member, said body member having a outlet region, a two-way liquid valve positioned within said outlet region, said liquid valve restricting liquid flow out of said hollow body member and permitting the flow of liquid into said hollow body member, air pump means, said air pump means interacting with said hollow body member to expel air from said hollow body member, a one-way air valve, said air valve preventing air flow into said hollow member and permitting air flow out of said hollow body member, comprising the steps of:

pumping air out of said device through said air pump means by constricting said air pump means, inserting said outlet region into a liquid such that the outlet of said outlet region is below the surface of said liquid, siphoning liquid into said device, by releasing said air pump means, air being prevented from entering said hollow body member by said air valve, withdrawing said outlet region from said liquid, the two-way liquid valve restricting flow of liquid out of said device, moving said device to a desired location, activating said liquid valve to allow said liquid to flow from said body member to said desired location, thus dispensing at least a portion of said liquid at said desired location, repeatedly activating said air pump while said outlet of said outlet region is below the surface of said liquid, said liquid valve preventing the flow of liquid from said device while permitting fluid flow into said device, thereby repeatedly drawing liquid into said device.

* * * * *